United States Patent [19]

Bergman et al.

[11] 3,925,644

[45] Dec. 9, 1975

[54] SYSTEM CONTROLLER FOR USE WITH RADIOLOGICAL ASSAY SYSTEM

[75] Inventors: Steven C. Bergman, Old Tappan; Thomas B. Gnirrep, Kinnelon; Charles A. Nazzaro, Hillsdale, all of N.J.

[73] Assignee: Hoffmann-La Roche Inc., Nutley, N.J.

[22] Filed: Feb. 4, 1974

[21] Appl. No.: 439,202

[52] U.S. Cl........................... 235/151.3; 235/151.35

[51] Int. Cl.[2]........................................... G06F 15/20

[58] Field of Search......... 235/151.3, 151.1, 151.35, 235/151, 92 PC; 250/336, 362, 363; 128/2 A, 2 G, 2.1 R, DIG. 5; 356/39; 340/172.5; 444/1

[56] References Cited

UNITED STATES PATENTS

| | | | |
|---|---|---|---|
| 3,688,120 | 8/1972 | Packard | 250/363 X |
| 3,691,386 | 9/1972 | Cavanaugh, Jr. | 235/151.35 X |

*Primary Examiner*—Joseph F. Ruggiero
*Attorney, Agent, or Firm*—Samuel L. Welt; Bernard S. Leon; Mark L. Hopkins

[57] ABSTRACT

A system controller is disclosed for use in a system for automatically performing radiological assays. The controller couples raw data from a scintillation counter to a calculator and feeds the calculator output, in suitable form, to one or more of a plurality of output devices. The data from the scintillation counter, which appears in decimal form, is converted to a multi-bit binary signal and stored in registers for transmission to the calculator. After the calculator has analyzed the data from the counter, the output data from the calculator is gated into additional registers in the system controller at appropriate times under the control of a timing pulse generator within the controller. The selection of the output devices is dependent upon the information stored within the additional controller registers.

10 Claims, 17 Drawing Figures

SYSTEM CONTROLLER FOR USE WITH RADIOLOGICAL ASSAY SYSTEM

This invention pertains to a system for performing automatically a radiological assay, wherein the output results can be reproduced on one or more of a plurality of output devices.

Radiological assays are used for various medical purposes. In such assays, specimens or samples are fed to a scintillation counter which, in a known manner, counts the scintillations occurring in the sample to provide an indication of the activity and/or of the radioisotopes. As an example, the raw data from the counter may indicate the number of counts and the period of time over which the count was taken.

To complete the assay, the raw data must be analyzed. This can be done by trained personnel or by appropriately programmed calculators which compare the raw data with previously existing "standards". The calculator output must then be fed to an output device such as a typewriter, card punch apparatus, teletype printer or the like for laboratory or clinical use or for further processing by suitable data processing equipment.

There are certain obvious advantages in automating the entire system operation for radiological assays. However, efforts in this direction have not been entirely successful, in part because of the lack of compatibility of the existing devices which form the essential parts of an automated system (i.e. scintillation counter, calculator, and, for example, card punch apparatus and teletype).

The present invention provides apparatus capable of interconnecting a standard scintillation counter and programmable calculator so that the raw data from the counter can be coupled to the calculator and operated on pursuant to a preselected program to yield a desired analysis. The system controller, according to the invention, is adapted to receive output data from the programmable calculator and, in response to programmed signals from the calculator, couple such output data to a selected one or more of a plurality of output devices.

Briefly, in accordance with the invention, a system controller of the type described comprises means for converting decimal information from a scintillation counter to a multi-bit binary signal having a preselected voltage level, register means for storing said binary signal, means for coupling the data stored in the registers to a calculator, additional register means for receiving output data from the calculator in binary form, the calculator output data being transferred to the additional register means under the control of a timing pulse generator within the system controller, and means for selectively coupling the registers to the output devices.

The invention is described in detail below with reference to the annexed drawing, wherein.

Figure 1:
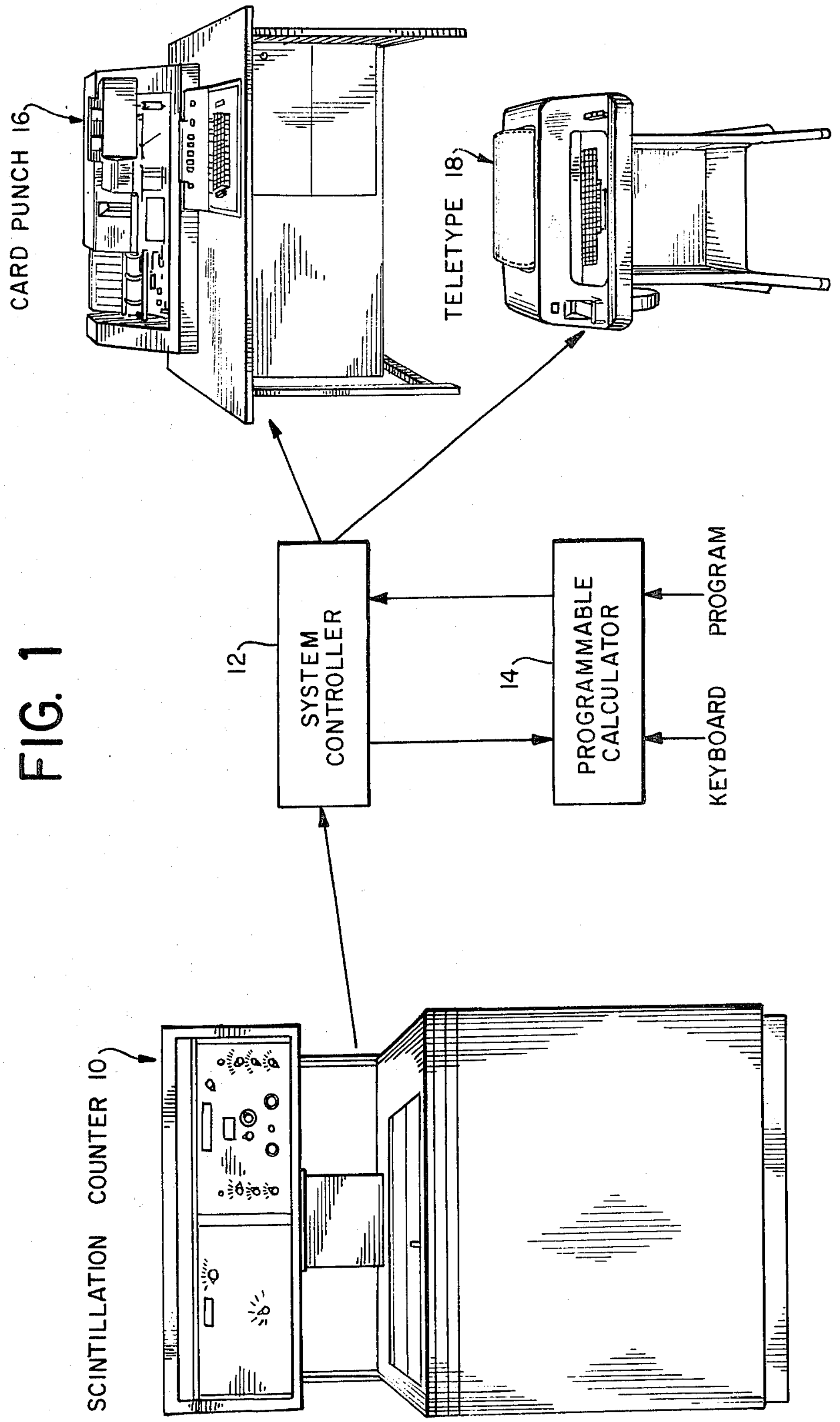
FIG. 1 is a general block diagram of an automated radiological assay system.
Figure 3A:
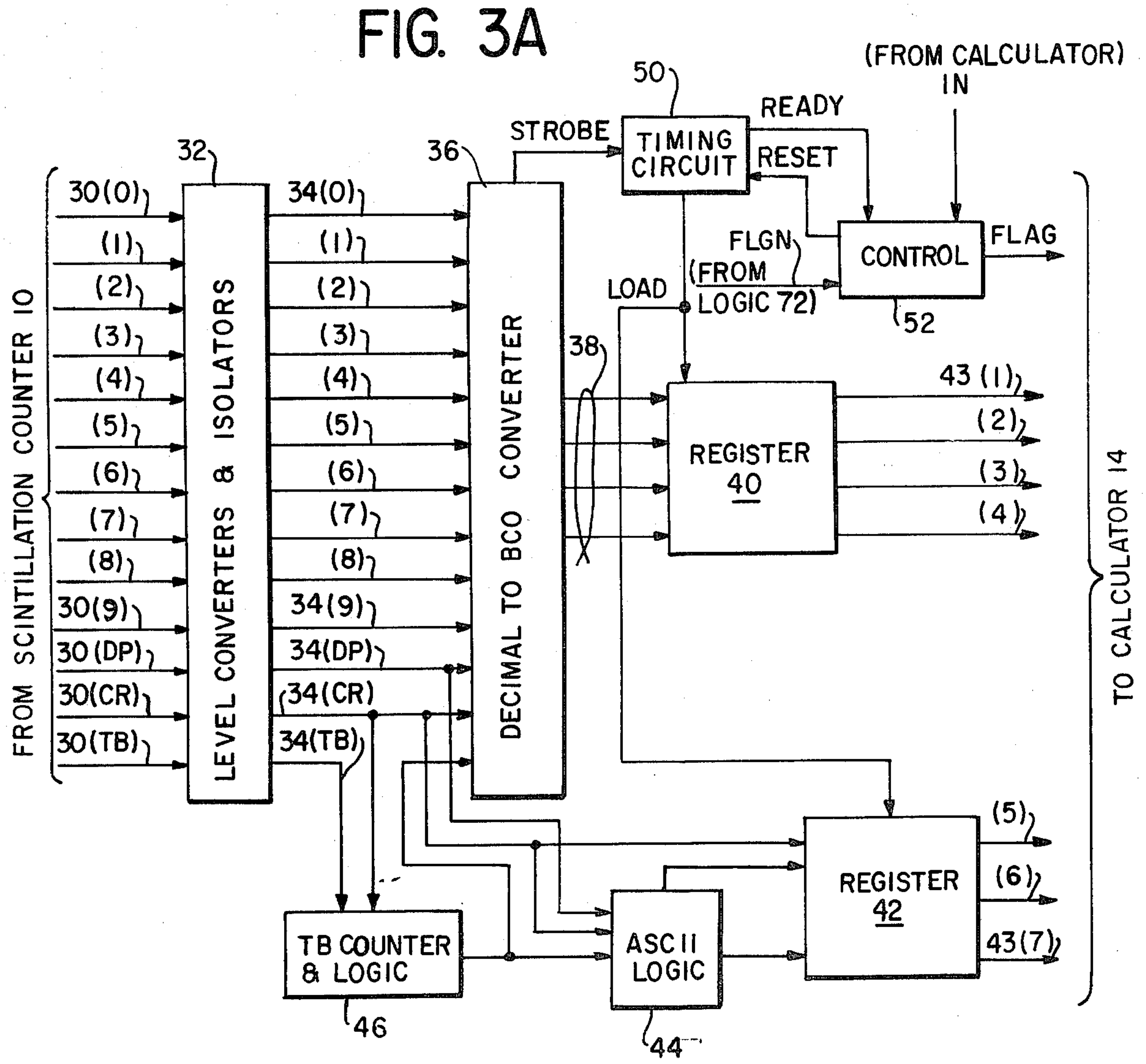
Figure 3B:
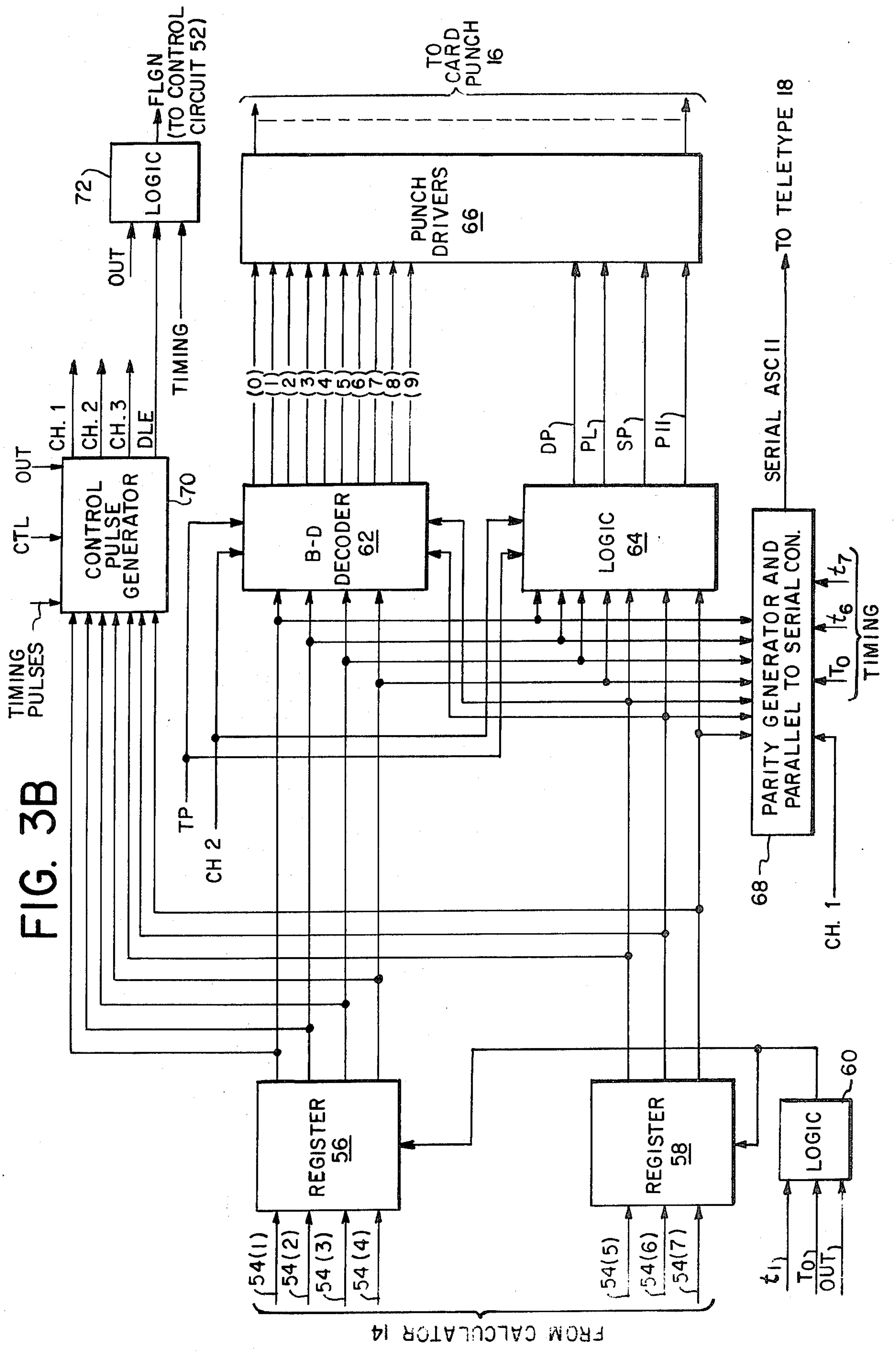
Figure 3C:
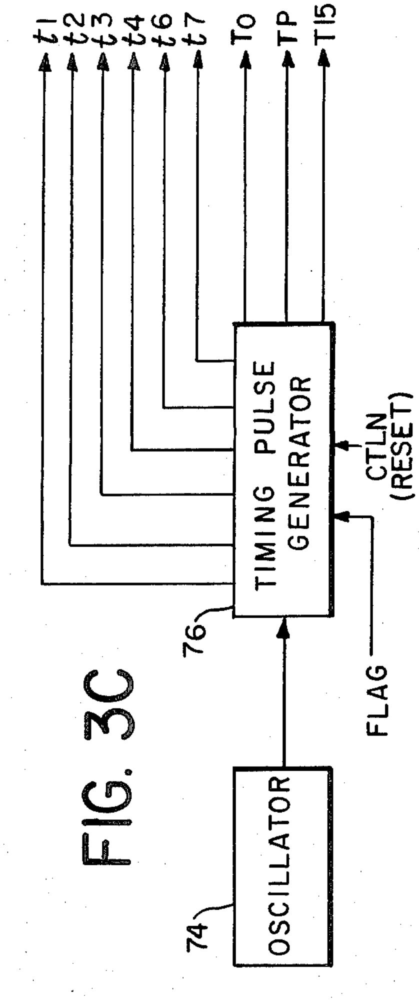
Figure 4:
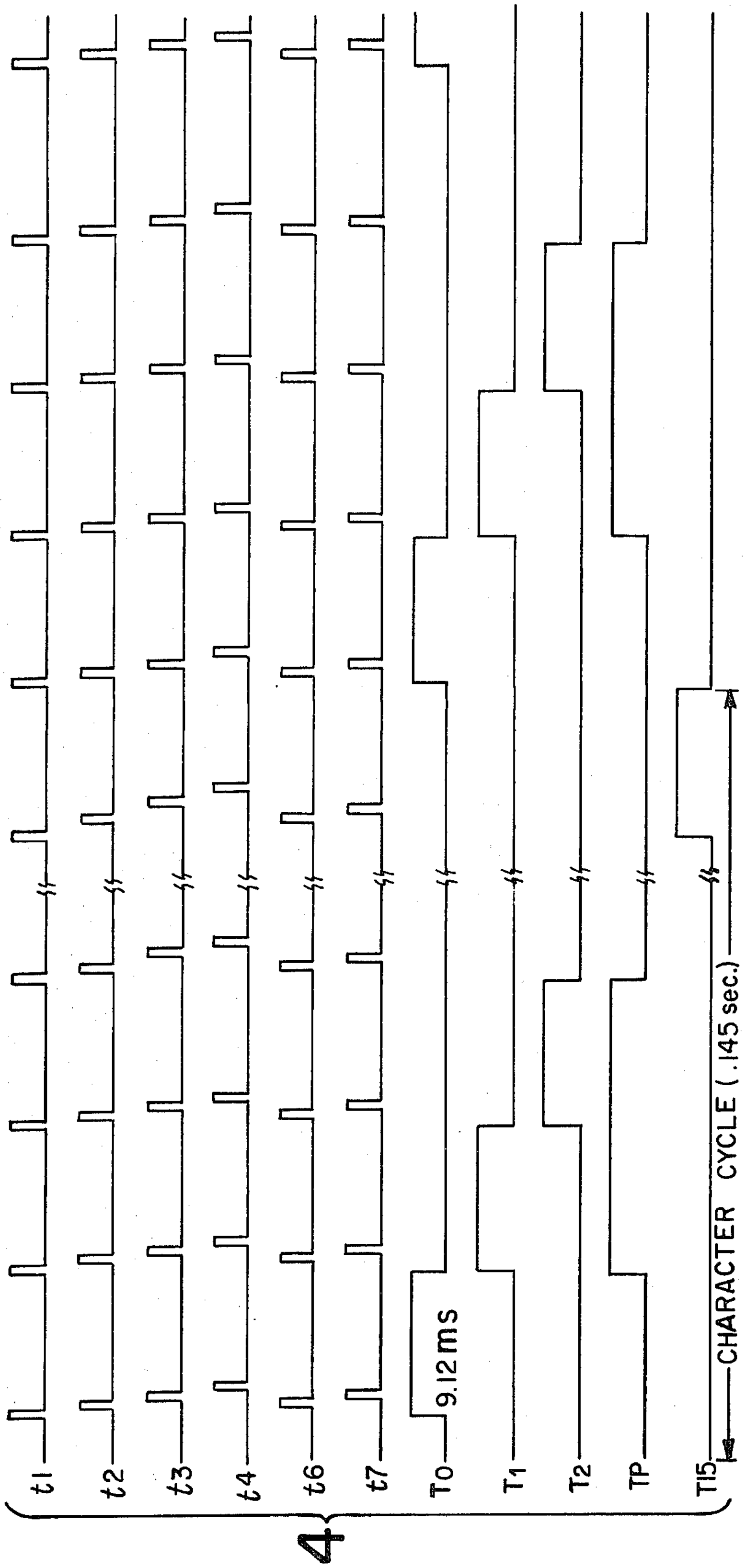

FIGS. 3A, 3B and 3C comprise a block diagram of the system controller shown in FIG. 1;

FIG. 4 is a timing chart depicting the timing pulses produced by the timing circuitry of the system controller; and FIGS. 5–15 are detailed schematic and logic diagrams of the circuits shown in block form in FIGS. 3A, 3B and 3C.

A system controller, according to the preferred embodiment of invention, has been designed to analyze the nanogram quantity of carcino-embryonic antigen (CEA) present in human blood plasma. Accordingly, in the following description, the invention is described as part of a CEA analytical system although, as noted previously, the invention could be used for other radiological assays.

FIG. 1 illustrates in block diagram form the components of the overall system. A scintillation counter 10 measures the gamma-emitting scintillations of the specimens and provides decimal-coded signals to the system controller 12. The information from counter 10 represents the scintillation count, the duration of the count period, and the identification number of the specimen.

The system controller 12 receives the decimal-coded information from the counter 10 and converts it to a form which is acceptable to a programmable calculator 14. The calculator then performs the necessary computations and returns the output data to the system controller 12 which then feeds the output data to one or more of a plurality of output devices such as a card punch machine 16 or a teletype printer 18.

In performing CEA analyses, the system must be calibrated for each day's operation. Hence, in practice, a separate program for calculator 14 would be used to calibrate the system, i.e. to generate data with which the raw data from the test specimens can be compared. In essence, during its calibration mode, the calculator generates a non-linear curve of radiation count versus CEA nanogram units so that the radiation count from the scintillation counter 10 (during its operating mode) can be correlated to CEA nanogram units for the individual specimens.

In accordance with the preferred embodiment, scintillation counter 10 comprises a Packard Model 3001 scintillation spectrometer. Calculator 14 may be a Hewlett-Packard Model 9810 programmable calculator. Card punch 16 may be an IBM Model 545 card punch and teletype 18 a Teletype Model 38 printer. These particular products are desired for various practical reasons but require, and produce, data in different codes and formats and at different rates. The system controller 12, according to the invention, enables these various preferred products or subsystems to communicate with each other. It includes level converters and code converters and special timing circuitry, as described below, so that it can effectively interface between the input and output devices while also controlling the rate at which the data is transmitted between the various subsystems.

By way of further explanation, a typical operating cycle of the entire system is described below prior to describing in detail the construction and operation of the system controller 12.

It is assumed that the specimens to be measured and the known standards (used to calibrate the system) have been loaded into the scintillation counter. The calibration program is then loaded into the calculator. The scintillation count and time data for the standards are coupled to the calculator 14 by the controller 12 and the calculator then determines the CEA nanogram values for the known standards. These calibration values are entered into the operating program for the calculator 14 either automatically or manually by means of a keyboard, and provide the reference for the subsequent samples to be measured. Other pertinent information, such as system and reagent identification values, may be entered by means of the calculator keyboard so that it will appear as part of the calculator output for each of the samples.

Figure 2:
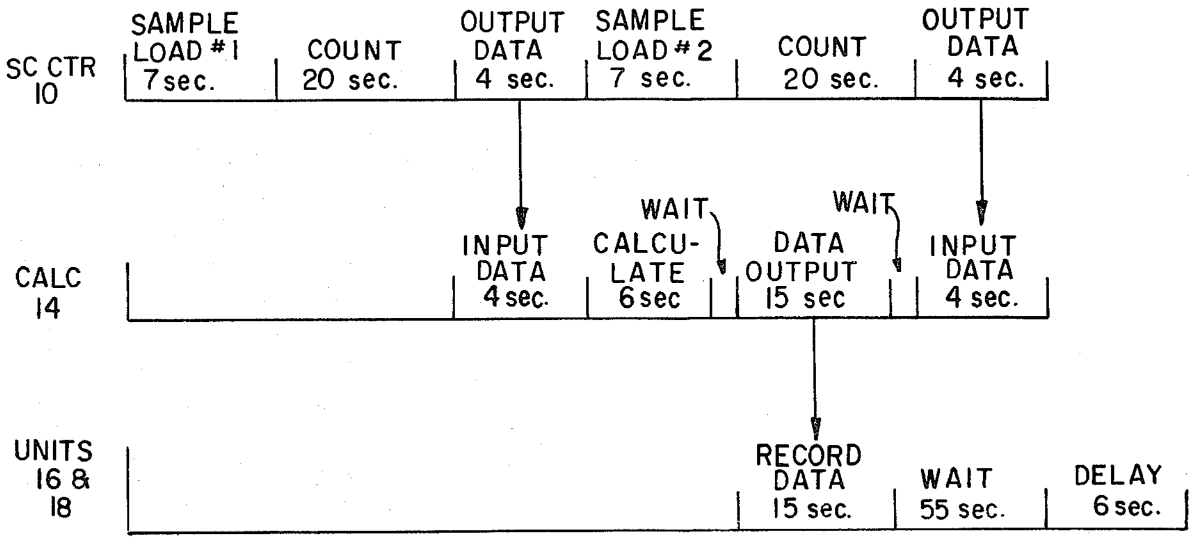
FIG. 2 is a time chart showing the sequence of operation of the system illustrated in FIG. 1.

The analytical operation is commenced by starting the scintillation counter. FIG. 2 shows the time sequence of a typical analytical cycle for two samples. In the first 7 seconds, sample No. 1 is moved to the sampling station within the counter. During the next 20 seconds, the counter counts the gamma-emitting scintillations of the specimen. The information from the scintillation counter is then transmitted through the system controller to the calculator 14 during the next 4 seconds. As mentioned previously, this information includes the specimen scintillation count, duration of the count period, and specimen identification number.

During the following 7 seconds, the second specimen is moved to the sampling station and at the same time, the calculator performs its necessary operations on the data pertaining to the first sample. This calculation may take, for example, 6 seconds. There is a 1-second waiting period, and then the calculator produces its output during the next 15 seconds (during which time the counter is counting the scintillations from the second sample).

While the calculator is producing its data output, the information is transmitted by the system controller to the output devices 16 and/or 18. In the example described in FIG. 2, there is a 5-second waiting period for the calculator before the input data for sample No. 2 is fed to it. This same cycle repeats continuously.

Reference is now made to FIGS. 3A, 3B and 3C which illustrate in block diagram form the system controller 12 according to the preferred embodiment of the invention.

Data from the scintillation counter 10 is fed to the system controller on a character by character basis via 13 lines identified in FIG. 3A as lines 30(0)–30(9), 30(DP), 30(CR) and 30(TB). A numerical character is represented by the appearance of a voltage on one of the 10 lines 30(0) through 30(9). A decimal point is represented by a voltage on line 30(DP), a TAB signal by a voltage on line 30(TB), and a carriage return signal by a voltage on line 30(CR). These signals are standard signals used, for example, to operate an IBM Selectric brand typewriter.

Nine items of information are transmitted for each sample being assayed by the scintillation counter 10. These items, in time sequence, are the following: TAB, SAMPLE NUMBER, TAB, RADIATION COUNT, TAB, COUNT TIME, TAB, CARRIAGE RETURN, and LINE FEED. These nine items may be considered to constitute a single data "line". The number of characters in a line will vary depending on the number of digits required to convey the numerical information.

The LINE FEED signal is not used by the system controller and therefore is ignored in the following discussion.

The operation of the system controller is responsive to the first three TAB signals which appear on line 30(TB). The sample number, radiation count and count time appear as purely numerical information and usually will include two or more digits, in some cases also including a decimal point which appears on line 30(DP).

The signals on each of the lines 30 are fed to respective level converters shown diagrammatically at 32 which, for example, convert the 45 volt output signal level from the scintillation counter to a 5 volt signal which appears on respective output lines 34(0)–34(9), 34(DP), 34(CR) and 34(TB). The level converters 32 may comprise commercially available optical isolators which provide complete electrical isolation between the input lines 30 from the scintillation counter and the converter output lines 34.

The decimal information which appears on the 13 lines 34 is coupled to a decimal-to-binary converter 36 which produces on its four output lines 38 a four bit binary character indicating which of the thirteen lines 34 contains a signal.

The Hewlett-Packard calculator 14 used in the preferred embodiment of the invention requires that information be coupled to it on a character-by-character basis in the United States standard code for information interchange (ASCII). In ASCII code, each character is represented by a combination of seven bits, the first four bits being capable of representing 16 different states, and the last three bits being capable of representing eight states, thus providing a total of 128 separate characters which can be represented.

A pair of registers 40 and 42 are provided to store a binary representation in ASCII code corresponding to the decimal information from the scintillation counter. Register 40 stores the first four bits and register 42 the last three bits which indicate, as known, whether the data stored in register 40 represents a numeral, a decimal point, carriage return, or tab signal. The fifth, sixth and seventh ASCII digits stored in register 42 are generated by a logic circuit 44 responsive to signals on lines 34(DP), 34(CR) and the output of a tab counter and logic circuit 46. The circuit 46 passes only the first three TAB signals [occurring on line 30(TB)]. During each output data period from the scintillation counter, four TAB signals are transmitted. The circuit 46 allows only the first three TAB signals to affect the operation of the system controller, thus allowing the apparatus to reject any additional or erroneous TAB signals which might result in improper control functions.

Registers 40 and 42 are loaded with the ASCII encoded data as soon as the information appears on the lines 30 from the scintillation counter. The transfer of the information to the registers 40 and 42 is under the control of a timing circuit 50 which, in turn, is responsive to the receipt of a strobe pulse from the decimal-to-binary converter 36. The strobe pulse is generated each time one of the input lines to converter 36 is high. Timing circuit 50 causes a slight delay (about 10 milliseconds) in the transfer of information to registers 40 and 42 to ensure that the voltages on lines 38 have reached their proper voltage levels.

Upon receipt of each strobe pulse, the timing circuit 50 also generates a READY signal to indicate that the registers 40 and 42 have been loaded and contain information to be transferred to the calculator. The READY signal is coupled to a control pulse generator 52 which is also responsive to an IN signal from the calculator to provide a control signal (designated as FLAG) which informs the calculator (in this instance) that the registers 40 and 42 contain data to be transferred to the calculator. The IN signal from the calculator only exists when the calculator is in condition to receive an input from the system controller. The calculator may be programmed to produce the IN signal but the specific means for producing it forms no part of this invention.

The condition of the registers 40 and 42 is sensed continuously by the calculator (when the FLAG signal is present) which receives the information on lines 43(1)–43(7) on a character-by-character basis as it is produced by the scintillation counter, but in the proper code and format. After all of the raw data for a sample being assayed has been transmitted (requiring, for example, about 4 seconds), the calculator will perform its necessary operations to assay the sample. This period may require about 6 seconds during which time the next sample is being loaded in the scintillation counter for the next analysis. When the calculations are complete, the calculator produces an OUT signal informing the system controller that the calculations are complete and that the calculator is ready to feed the results to the output devices.

The output information from the calculator appears in ASCII code on lines 54(1)–54(7) (FIG. 3B). This information is coupled to registers 56 and 58 which are responsive to lines 54(1)–54(4) and 54(5)–54(7), respectively. Because the information on the lines 54 from the calculator is constantly changing at a high rate of speed and ordinarily is not pertinent, it is necessary to gate this information to registers 56 and 58 at appropriate times. For this purpose, a logic circuit 60, responsive to timing pulses (designated $t1$ and $T_0$) and the OUT control pulse from the calculator, enables the registers to accept the information at appropriate time intervals. The manner in which the timing pulses $t1$ and $T_0$ are generated is described below. For the present purposes, it is sufficient to note that logic circuit 60 produces an enabling pulse to permit information to be read into registers 56 and 58 each time the calculator lines 54 contain information which represents one of the desired characters from the calculator which control the system operation, or which bear the information to be reproduced by the output devices. As an example, information may be provided by the calculator at a rate of about seven characters per second, a rate determined by the slowest output device (in this case, card punch 16).

Registers 56 and 58 hold the desired information regardless of any change in condition of the calculator output lines 54. This is because removal of the enabling signal from logic circuit 60 prevents any change in the condition of the registers and the registers are only enabled when appropriate information appears on the calculator output lines 54.

The contents of registers 56 and 58 are coupled to a binary-to-decimal decoder 62 and a card punch logic circuit 64. The devices 62 and 64 provide 14 output lines which actuate punch drivers 66 within the system controller to provide a plurality of output signals for driving a card-punching mechanism such as IBM card punch Model No. 545. The numerical information for the card punch is derived from the binary-to-decimal decoder 62 which energizes one of its 10 output lines depending upon the binary signal appearing on its four input lines. The four outputs from logic circuit 64 are arranged so that one or more of the output lines from decoder 62 and logic circuit 64 are energized, pursuant to a known code, to cause the appropriate blanks of the card to be punched to represent the information stored within registers 56 and 58.

The decoder 62 and logic circuit 64 are enabled by timing pulses TP and a control signal CH2 which are derived from timing pulse generator (76) and control pulse generator (70) circuitry within the system controller. The TP timing signal, for example, may be approximately 18 milliseconds long and occurs about 7 times per second. The CH2 control signal is derived as explained below under control of the calculator when it is desired to energize the card punch output device.

The outputs from registers 56 and 58 are also coupled in parallel to a circuit 68 which generates a parity signal and converts the seven-bit parallel ASCII code (with parity) to a serial ASCII code with parity.

The circuit 68 is only enabled when a CH1 control signal is present indicating that the contents of registers 56 and 58 are to be connected to a teletype output device. The parallel-to-serial converter within circuit 68 is under the control of timing pulses $T_0$, $t6$ and $t7$ and produces a serial output at a rate of about 77 bits per second (i.e. seven characters per second) including the usual teletype stop and start pulses.

In accordance with the preferred embodiment, the system is capable of operating a card punch machine, a teletype printer, or both. For this purpose, the calculator may be programmed to produce a signal which causes the system controller to select a desired output device. This signal is referred to below as a data link escape (DLE) signal. This DLE signal is also used by the system controller to provide an alarm if an abnormal operating condition (e.g. arrival of input data for a specimen prior to read-out of data for the preceding specimen) exists.

In accordance with the invention, control pulses designated as CH1, CH2 and CH3 are generated by a control pulse generator 70. The signal CH1 enables the teletype printer and CH2 energizes the card punch device. The control signal CH3 is for operating the alarm.

The control pulse generator 70 receives timing pulses, which are generated internally by the system controller, together with the calculator control signals CTL and OUT. The CTL signal from the calculator appears prior to each multi-bit character to be transmitted to or from the calculator and, thus, in the illustrated embodiment, occurs approximately 7 times per second. The calculator OUT signal is provided by the calculator when the calculator is feeding its data to the output devices.

As described in detail below, the control pulse generator 70 is responsive to the seven-bit ASCII signal stored in the registers 56 and 58. The presence of the DLE signal from the calculator is sensed by generator 70 and at, appropriate times (determined by the timing pulses), the signals CH1 and/or CH2 and/or CH3 are generated depending upon the next character (a numeric) transmitted by the calculator under the control of its softwear.

Additionally, the control pulse generator provides a DLE output line which is enabled when a data link escape signal is transmitted by the calculator. This DLE signal is coupled to a logic circuit 72 which is also responsive to the calculator OUT signal and appropriate timing pulses to provide an FLGN control signal. The FLGN signal is coupled to control circuit 52 (FIG. 3A) to provide the FLAG signal for the calculator during the output mode.

The timing circuit of the system controller which synchronizes the various input and output operations is illustrated diagramatically in FIG. 3C. It includes an oscillator 74 and a timing pulse generator 76 responsive to the FLAG control pulses as an enabling signal. The oscillator, for example, may have a frequency of about 450 khz. The timing pulse generator 76 produces timing pulses on separate lines shown as $t1$–$t4$, $t6$, and $t7$ $T_0$ and TP. The relationship of these pulses is shown in the timing chart on FIG. 4 and a more detailed logic di agram of the timing pulse generator is described below with reference to FIG. 15. By way of example, the pulses $t1$–$t7$ may have a duration of about 0.57 milliseconds. The timing pulse $T_0$ may have a duration of 9.12 milliseconds and occur once every 0.145 seconds to initiate each timing cycle (i.e. each character). Hence, data from the calculator is coupled to the output devices at a rate of about seven characters per seconds.

FIGS. 5 through 15 illustrate in greater detail the elements of the individual blocks of FIGS. 3A through 3C. In FIGS. 5 through 15, the parts are numbered to correspond with FIGS. 3A, 3B and 3C.

Figure 5:
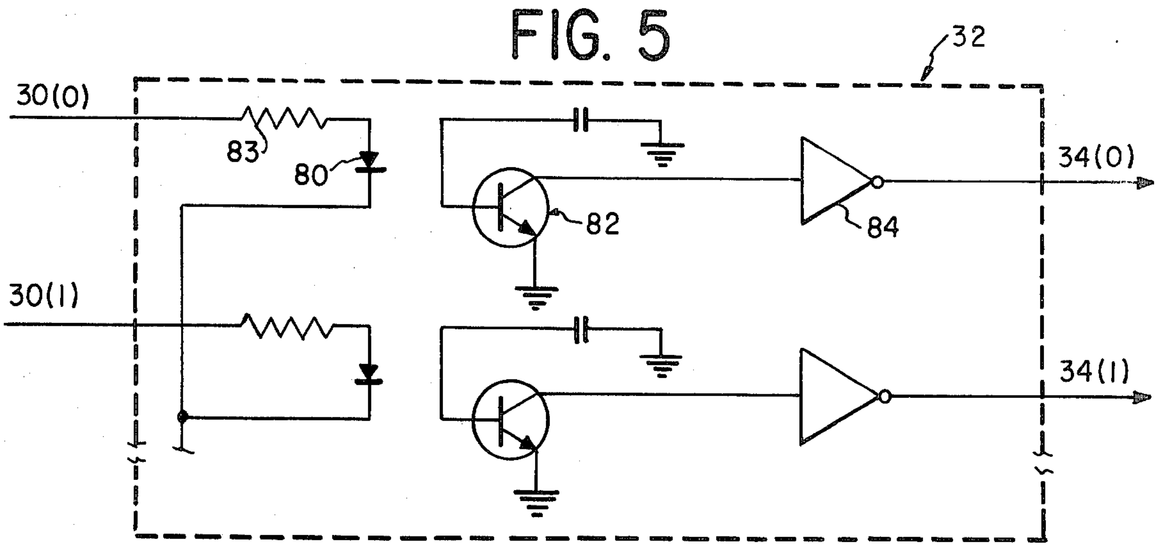

FIG. 5 shows the level converter and isolator 32. It consists essentially of a series of photo-diodes 80 and photo-transistors 82. Each transistor 82 conducts current in proportion to the extent of illumination of its corresponding diode 80 as determined by the voltage on line 30 and the size of a series resistor 83. Hence, when a 45 volt signal appears on one of lines 30, the resultant current conduction through the associated resistor 83 and diode 80 causes current flow through transistor 82. A change in voltage on the collector of transistor 82 is amplified by an inverting amplifier 84 which produces (for example) a 5-volt signal on its output line 34. There is complete isolation and undesired noise signals which fail to illuminate diode 80 are also filtered out.

Figure 6:
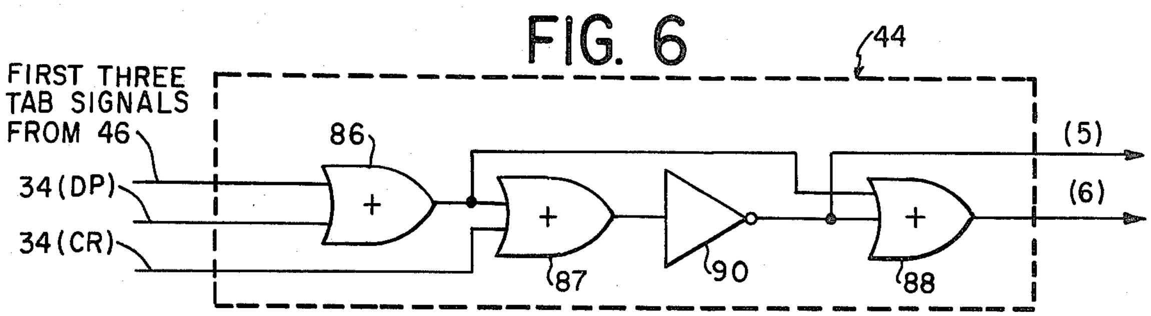

The ASCII logic circuit 44 is shown in FIG. 6. It includes three OR gates 86, 87 and 88 and an inverting amplifier 90 between the output of OR gate 87 and an input to OR gate 88. Logic circuit 44 provides the fifth and sixth digit positions of the ASCII code when a TAB, DECIMAL POINT or CARRIAGE RETURN signal is present. (As shown in FIG. 3A, the CARRIAGE RETURN signal on line 34 (CR) is coupled directly to the seventh position in register 42). Hence, the fifth, sixth and seventh bit positions for the available characters (the 5th and 6th bits being generated by logic circuit 44) are as follows:

| Character | 5th Bit | 6th Bit | 7th Bit |
|---|---|---|---|
| 0–9 | 0 | 1 | 1 |
| CR | 0 | 0 | 1 |
| TB | 0 | 1 | 0 |
| DP | 0 | 1 | 0 |

Figure 7:
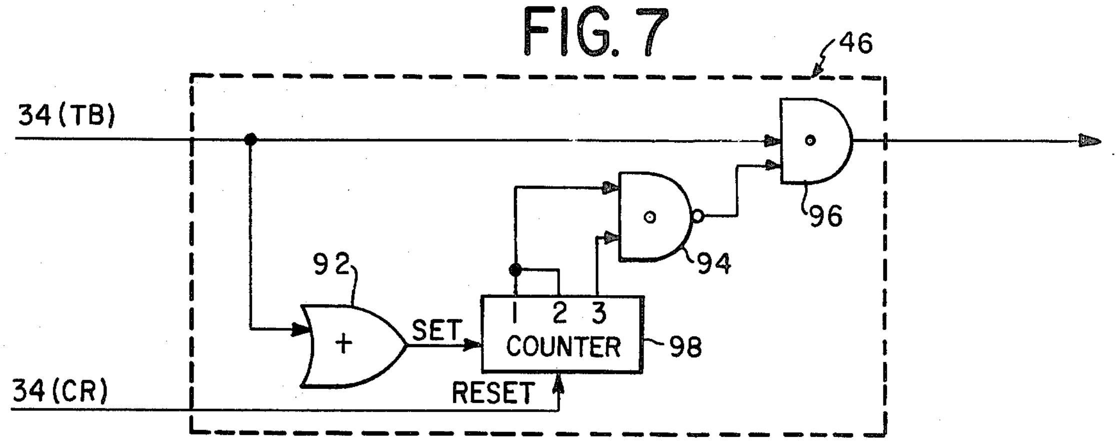

The tab counter and logic circuit 46 is shown in detail in FIG. 7. It comprises an OR gate 92, a NAND gate 94, an AND gate 96 and a threes counter 98. Each TAB signal from line 34 is fed to the counter 98. As these pulses are counted, the first three will enable AND gate 96 to permit the pulses on line 34 (TB) to pass to the decimal-to-binary converter 36. However, if more than three TAB pulses are transmitted (before a CARRIAGE RETURN signal), the AND gate 96 is not enabled and, consequently, these additional TAB pulses cannot be passed to the converter 36.

When a complete line of data has been transmitted, the presence of a CARRIAGE RETURN signal on line 34(CR) will reset the counter 98 so that the circuit 46 is then in condition to pass the next three TAB pulses.

Figure 8:
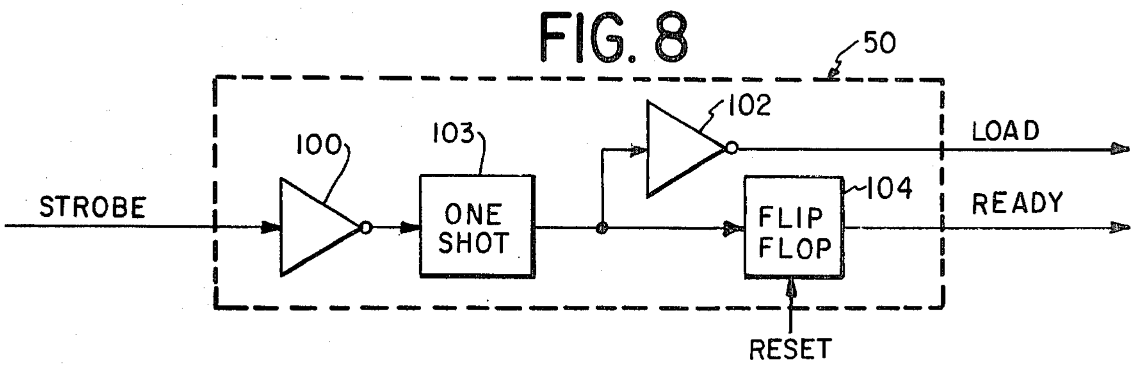

The timing circuit 50 is shown in FIG. 8. It includes inverters 100 and 102, a one-shot or mono-stable multivibrator 103 and a flip-flop 104. The one-shot multivibrator 103 serves as a delay means for the strobe pulses so that the LOAD pulses will occur after the input lines to the registers 40 and 42 have stabilized at the proper voltage level corresponding to the presence or absence of a pulse. The flip-flop 104 provides the READY pulses the operation of which has been described with respect to FIG. 3A. Hence, the READY pulse exists each time a LOAD pulse is produced. The reset pulse for flip-flop 104 is generated by the control circuit 52 as described in the following.

Figure 9:
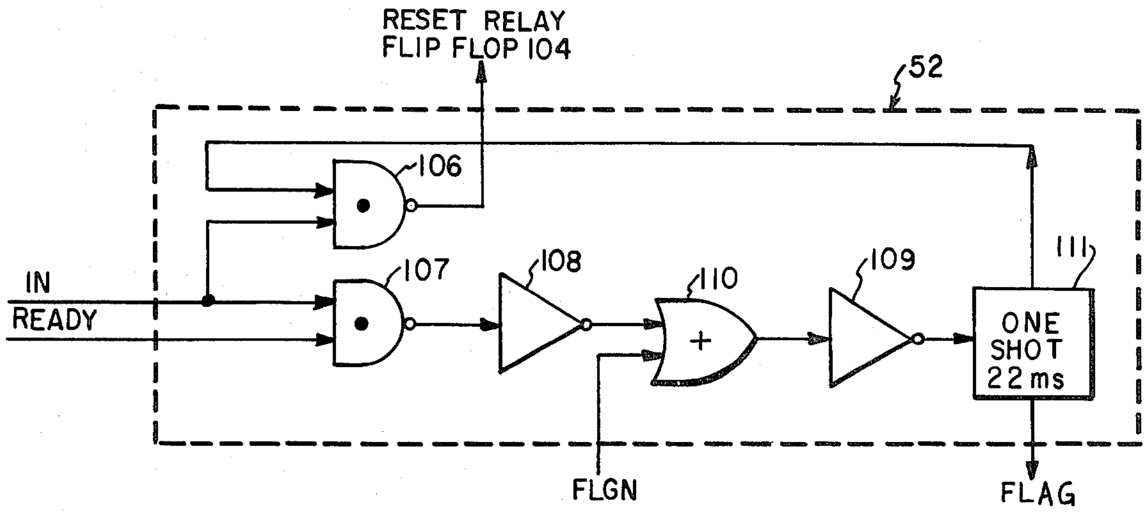

The control circuit 52, shown in FIG. 9, includes NAND gates 106 and 107, inverters 108 and 109, OR gate 110 and a one-shot multivibrator 111. Essentially, the function of the control circuit 52 is to generate a signal for the calculator (designated hereinafter as a FLAG signal) after the registers 40 and 42 have been loaded and the information is ready to be transmitted to the calculator (as indicated by the READY SIGNAL). The one-shot introduces a delay (for example, about 22 milliseconds) so that the FLAG signal is generated each time the registers are loaded and the calculator is in condition to receive information (designated by the absence of a calculator IN signal). The output of the one-shot 111 is also coupled to NAND gate 106 together with the IN signal from the calculator to produce the reset pulse used to reset the ready flip-flop 104 (FIG. D).

The FLAG signal is also generated in response to the internal control signal FLGN, coupled to OR gate 110, when a DATA LINK ESCAPE signal is transmitted by the calculator or at the end of each character cycle during the calculator OUT mode.

Figure 10:
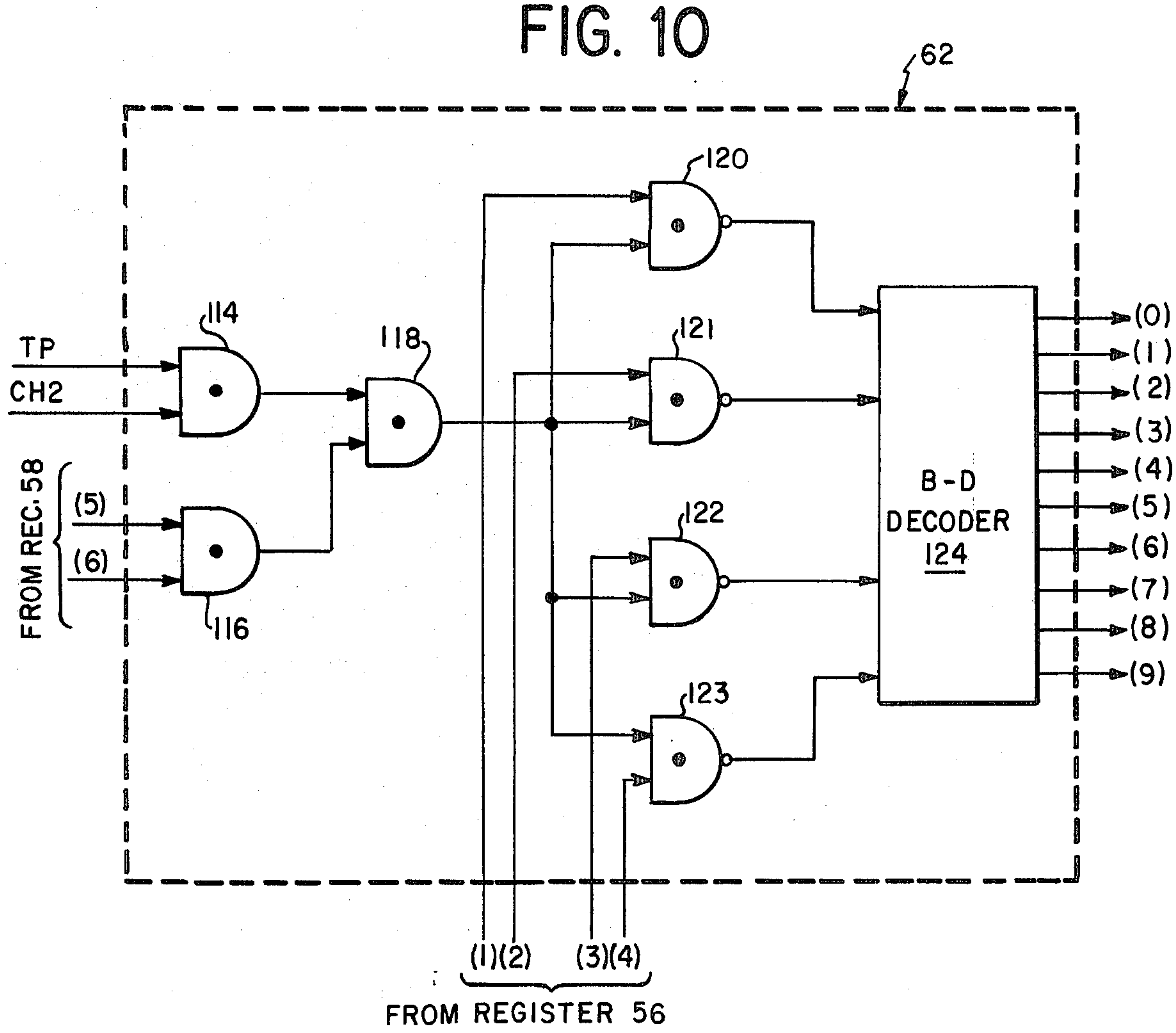
Figure 11:
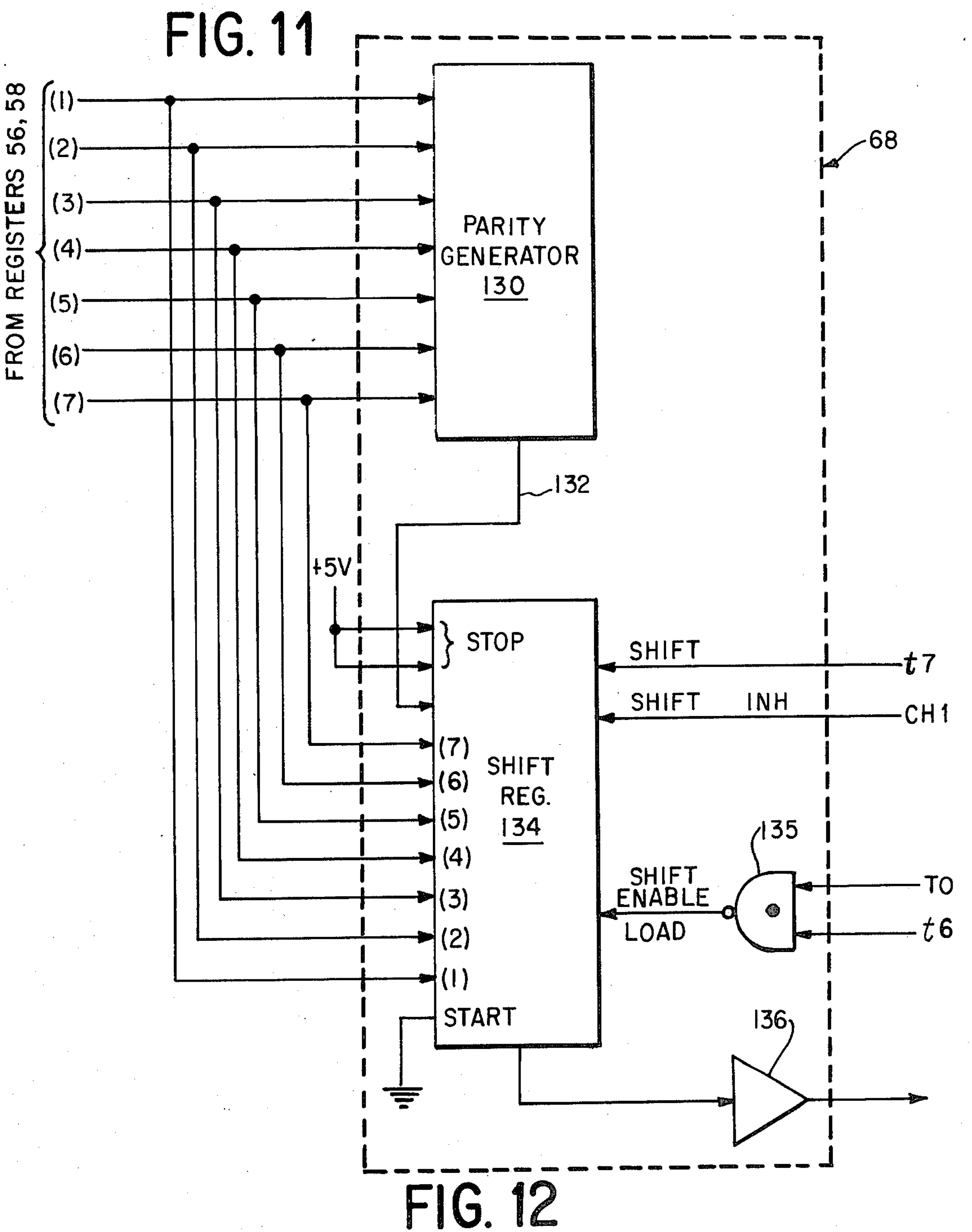
Figure 12:
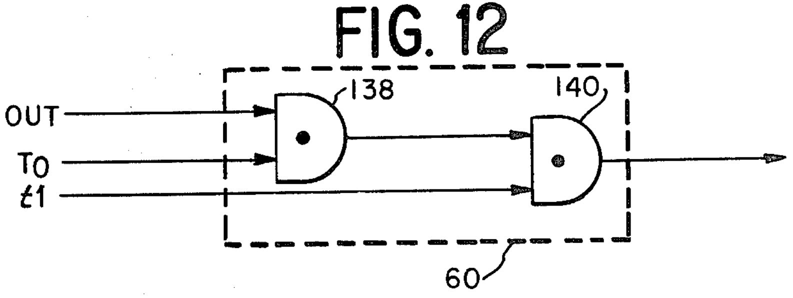

The detailed logic diagrams corresponding to FIG. 3B are shown in FIGS. 10–12. Decoder 62 is shown in FIG. 10 and includes AND gates 114, 116 and 118, four NOR gates 120–123, and a binary-to-decimal decoder 124. The first four ASCII bit positions from register 56 are coupled through the respective NOR gates 120–123 to the decoder 124. Decoder 124 may be a well-known device which energizes one of its 10 output lines depending upon the four-bit binary code at its input. The NOR gates 120-123 are enabled only when the card punch timing pulse TP and the punch control pulse CH2 exist concurrently with the presence of data in the fifth and sixth bit positions (indicating numeric information) within register 58. Hence, the output of the decoder 124 represents numerical information and occurs only when the punch control pulse CH2 exists during the punch timing period TP.

The specific logic of the circuit 64 is not shown in detail. This logic circuit 64 was designed for a specific card punch (IBM Model No. 545) and produces the four known non-numeric outputs briefly alluded to above. Logic circuit 64 may comprise four NAND gates (for the respective outputs) enabled by the presence of the punch timing pulse TP and the punch control pulse CH2, with the gates responding to preselected binary signals from registers 56 and 58 to provide the desired driving signals.

The parity generator and parallel-to-serial generator 68 are shown in FIG. 11. The parity generator 130 is responsive to the seven bits of information in registers 56 and 58 and transmits a parity pulse on line 132 to a shift register 134. Shift register 134 should be capable of storing eleven bits of information. The first bit position, shown as being grounded, is the standard teletype start pulse. The next seven bits correspond to the character information and the eighth bit is the parity pulse. The last two register positions correspond to the two teletype stop pulses. A NAND gate 135, responsive to $T_0$ and $t6$ timing pulses, enables register 134 to receive data from registers 56 and 58, and also enables the data in register 134 to be shifted serially upon receipt of shift pulses. The timing pulses $t7$ cause the information to be shifted serially from register 134 through an amplifier 136 to the teletype output. During loading of shift register 134, the CH1 control signal inhibits the shifting of data through register 134.

The logic circuit 60 is shown in FIG. 12 and includes two AND gates 138 and 140 responsive to the timing signals $T_0$, and $t1$ and OUT control signal from the calculator. Thus, the output of the logic circuit 60 is a timing pulse (used to enable registers 56 and 58) which occurs only when the timing pulses $t1$ and $T_0$ are present, provided that a calculator OUT signal exists.

Figure 13:
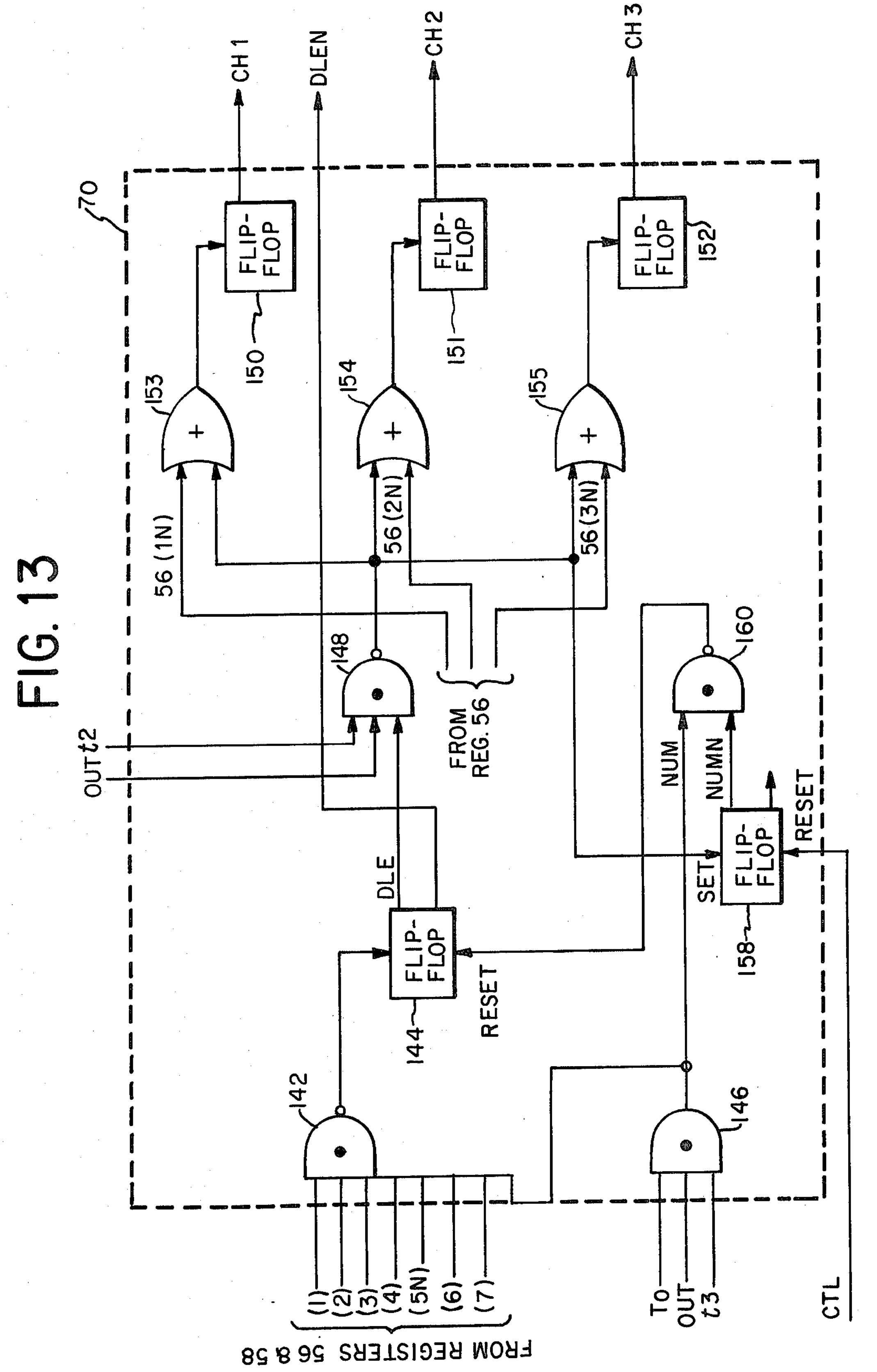

The control pulse generator 70 is illustrated in FIG. 13. A NAND gate 142 responsive to the information content of registers 56 and 58 sets a flip-flop 144 when a data link escape (DLE) signal produced by the calculator is stored in registers 56 and 58. In the illustrated example, the DLE signal may be 1101111 so that AND gate 142 is connected to the negated fifth-bit position of register 58. The NAND gate 142 is only enabled when an output is produced by AND gate 146 during the To · $t3$ time slot when a calculator OUT signal exists.

When a signal is passed through NAND gate 142, it sets a flip-flop 144 which then enables NAND gate 148 during the next timing cycle at time To · $t2$ provided the calculator OUT signal still exists.

The CH1, CH2 and CH3 control signals are produced by setting three flip-flops 150, 151 and 152, respectively. These flip-flops are set after the computer has sent the data link escape signal by the subsequent transmission from the calculator (on the next character cycle) of a numeric character. For example, the calculator may send a numeric 0,1,2,3,4 or 7. The occurrence of these numerics will cause the following functions:

| Numeric | Control Signal |
|---|---|
| 0 | No control signal |
| 1 | CH1 |
| 2 | CH2 |
| 3 | CH1 and CH2 |
| 4 | CH3 |
| 7 | CH1, CH2 and CH3 |

Hence, three OR gates 153, 154 and 155, respectively, receive the negated first, second and third stored bits from register 56 and the output of the NAND gate 148 whereby the corresponding flip-flop 150, 151 or 152 will be set in the character cycle following the transmission of a data link escape signal by the calculator.

Flip-flop 144 is reset upon termination of the $t2$ pulse in the succeeding character cycle by means of a flip-flop 158 which is set by the NAND gate 148 to provide an enabling signal for NAND gate 160. Upon receipt of the next timing pulse $t3$ (during the $T_0$ period), the NAND gate 160 resets the flip-flop 144. This will not affect any of the flip-flops 150, 151 and 152 if they have already been set.

Flip-flop 158, in turn, is reset by the calculator by transmission of a CTL signal which, as previously noted, occurs once per character.

Figure 14:
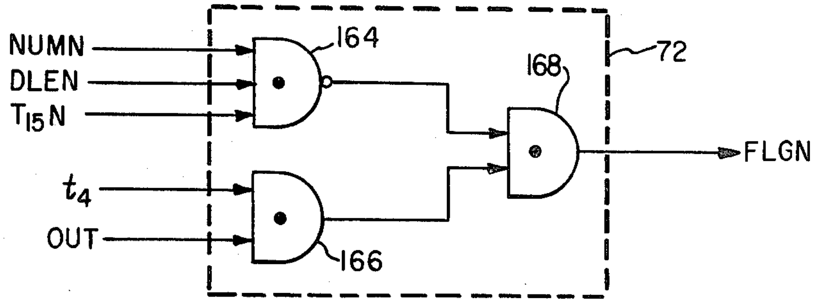

The logic circuit 72 which produces the FLGN control signal is shown in FIG. 14. It consists of NAND gate 164 and AND gates 166 and 168 which are responsive to the inputs as labeled. NAND gate 164 is only opened during the last timing period $T_{15}$ or when flip-flops 144 and 158 are reset (represented by signals DLEN and NUMN, respectively). Thus, in the absence of a data link escape signal, the FLGN signal only exists during the $t4$ slot of the $T_{15}$ period.

Figure 15:
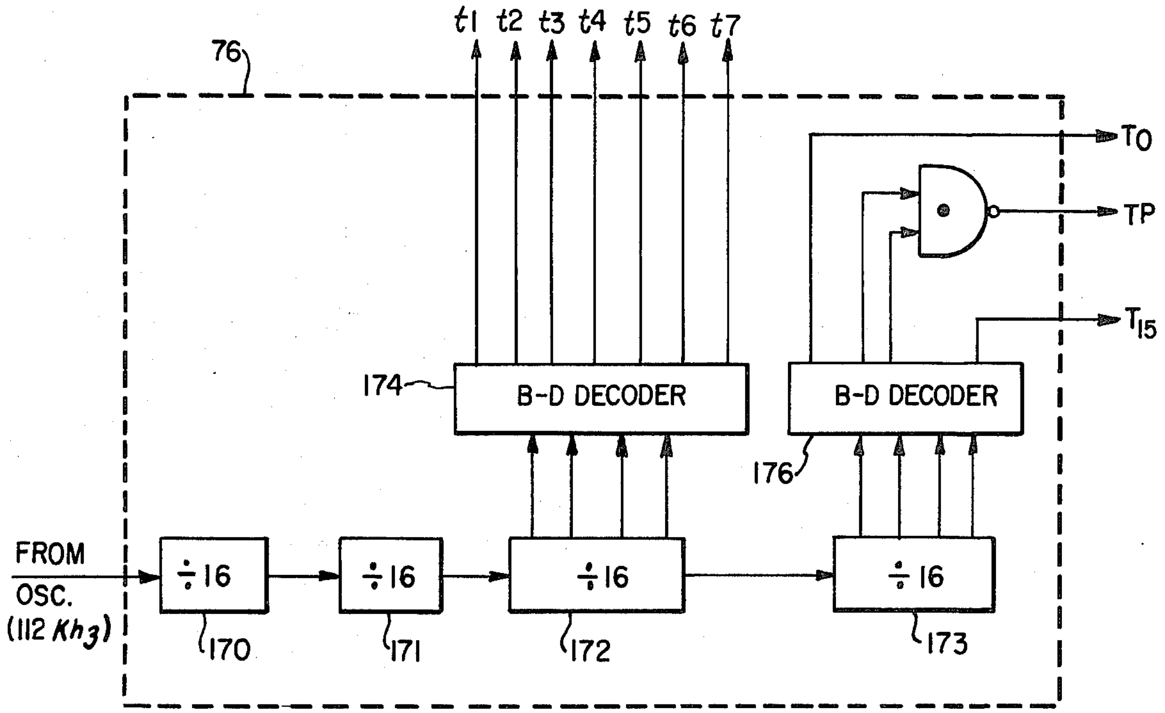

The timing pulse generator 76 is shown in FIG. 15. It includes four cascaded dividers 170–173 each of which divides the incoming pulse train by 16. These dividers are standard four-stage devices and the four stages of counters 172 and 173 are connected to respective binary-to-decimal decoders 174 and 176. Decoders 174 and 176 operate as commutators to provide the timing pulses described above as indicated in FIG. 4. Decoders 174 and 176 are capable of energizing one out of 16 output lines depending on the binary input to the decoder. This binary input represents the condition of the four stages of the counters 172 and 173. Hence, assuming an oscillator frequency of 450 khz, each of the pulses $t1$, $t2$, etc. will be approximately 0.57 milliseconds long. The pulses $T_0$, $T_1$, etc., will be about 9.12 milliseconds long and occur at a rate of about 7 per second thereby defining the time required to transmit a character from the calculator to an output device.

What is claimed is:

1. A system controller for use in radiological assays for coupling raw data appearing in decimal form on a plurality of lines from a scintillation counter to a calculator and for connecting the calculator to at least one of a plurality of output devices, comprising means for converting the voltage levels appearing on said lines to a second voltage level, means responsive to said converting means for producing a multi-bit binary signal indicating which of said lines contains a signal, multi-stage register means for storing said binary signal, means for coupling the data stored in said register means to said calculator, additional register means for storing characters in binary form transmitted by said calculator, a timing pulse generator, gating means connected to said timing pulse generator for cyclically connecting said calculator and additional register means at preselected times when said calculator is generating output data, and control means connected to said timing pulse generator and said additional register means for selectively coupling said additional register means to said output devices, said control means being responsive to the information stored in said additional register means.

2. A system controller according to claim 1, wherein said control means comprises gating means responsive to a first predetermined stored signal in said additional register means for generating a data link escape signal for selection of an output device a plurality of bistable devices, and means responsive to additional predetermined stored signals in said additional register means and the presence of said data link escape signal for selectively placing said bistable devices in preselected states.

3. A system controller according to claim 1, wherein said control means includes a first bistable device setable at a preselected time when a predetermined signal is stored in said additional register means, and means for resetting said first bistable device a predetermined time after it has been set.

4. A system controller according to claim 3, wherein said control means further includes means for operating selected control signals at predetermined times after said bistable device is set depending upon a second predetermined signal stored in said additional register means.

5. A system controller according to claim 1, further comprising a multi-stage shift register for receiving in parallel the binary information stored in said additional register means in response to said control means, and means responsive to said control means and timing pulse generator for shifting from said shift register serially the binary bits stored therein.

6. A system controller according to claim 1, further including binary-to-decimal decoder means responsive to the binary information stored in said additional register means, said decoder means being enabled by the outputs of said control means and said timing pulse generator.

7. A system controller according to claim 5, further including binary-to-decimal decoder means responsive to the binary information stored in said additional register means, said decoder means being enabled by the outputs of said control means and said timing pulse generator.

8. A system controller according to claim 7, wherein said control means includes a first bistable device settable at a preselected time when a predetermined signal is stored in said additional register means, and means for resetting said first bistable device a predetermined time after it has been set.

9. A system controller according to claim 8, wherein said control means further includes means for operating selected control signals at predetermined times after said bistable device is set depending upon a second predetermined signal stored in said additional register means.

10. A system controller according to claim 1, wherein said multi-stage register means includes a storage register responsive to preselected combinations of selected inputs to said means for converting.

* * * * *